United States Patent [19]
Hittich et al.

[11] Patent Number: 5,616,284
[45] Date of Patent: Apr. 1, 1997

[54] LIQUID-CRYSTALLINE MEDIUM

[75] Inventors: Reinhard Hittich, Modautal, Germany; Bernhard Rieger, Yokohama, Japan; Volker Reiffenrath, Rossdorf, Germany; David Coates, Wimborne, Great Britain; Herbert Plach, Darmstadt, Germany

[73] Assignee: Merck Patent Gesellschaft mit beschrankter Haftung, Darmstadt, Germany

[21] Appl. No.: 453,355

[22] Filed: May 30, 1995

Related U.S. Application Data

[63] Continuation of Ser. No. 188,353, Jan. 28, 1994, abandoned, which is a continuation of Ser. No. 688,519, filed as PCT/EP91/00684, Apr. 11, 1991 published as WO91/16395, Oct. 31, 1991, abandoned.

[30] Foreign Application Priority Data

Apr. 13, 1990 [DE] Germany ............ 40 12 014.7

[51] Int. Cl.$^6$ ............ C09K 19/30; C09K 19/52; G02F 1/13
[52] U.S. Cl. ............ 252/299.63; 252/299.01; 252/299.66; 349/182
[58] Field of Search ............ 252/299.01, 299.63, 252/299.64, 299.65, 299.66; 359/103

[56] References Cited

U.S. PATENT DOCUMENTS

| | | | |
|---|---|---|---|
| 4,545,922 | 10/1985 | Eidenschink et al. | 252/299.63 |
| 4,814,523 | 3/1989 | Tanaka et al. | 252/299.63 |
| 5,032,313 | 7/1991 | Goto et al. | 252/299.63 |
| 5,122,295 | 6/1992 | Weber et al. | 252/299.01 |
| 5,174,920 | 12/1992 | Iijima | 252/299.01 |
| 5,286,411 | 2/1994 | Rieger et al. | 252/299.63 |
| 5,350,535 | 9/1994 | Rieger et al. | 252/299.63 |
| 5,368,772 | 11/1994 | Rieger et al. | 252/299.63 |
| 5,397,505 | 3/1995 | Rieger et al. | 252/299.67 |
| 5,409,637 | 4/1995 | Rieger et al. | 252/299.63 |

*Primary Examiner*—Shean C. Wu
*Attorney, Agent, or Firm*—Millen, White, Zelano, & Branigan, P.C.

[57] ABSTRACT

The invention relates to a liquid-crystalline medium based on a mixture of polar compounds of positive dielectric anisotropy, characterized in that it contains one or more compounds of the general formula I

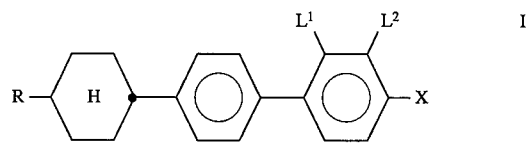

in which X is fluorine, chlorine, $CF_3$, $OCF_3$ or $OCHF_2$, one of the radicals $l^1$ and $l^2$ is fluorine, the other radical $l^1$ or $l^2$ is hydrogen and R is alkyl, oxaalkyl, fluoroalkyl or alkenyl, in each case having up to 7 carbon atoms.

7 Claims, No Drawings

LIQUID-CRYSTALLINE MEDIUM

This application is a continuation, of application Ser. No. 08/188,353, filed Jan. 28, 1994, now abandoned which is a continuation of application Ser. No. 07/688,519, filed as PCT/EP91/00684, Apr. 11, 1991 published as WO91/16395, Oct. 31, 1991, now abandoned.

BACKGROUND OF THE SPECIFICATION

The present invention relates to a liquid-crystalline medium, to the use thereof for electrooptical purposes, and to displays containing this medium.

Liquid crystals are used, in particular, as dielectrics in display devices since the optical properties of such substances can be affected by an applied voltage. Electrooptical devices based on liquid crystals are extremely well known to those skilled in the art and may be based on various effects. Devices of this type are, for example, cells having dynamic scattering, DAP (deformation of aligned phases) cells, guest/host cells, TN cells having a twisted nematic structure, STN (super-twisted nematiic [sic]) cells, SBE (super-birefringence effect) cells and OMI (optical mode interference) cells. The most common display devices are based on the Schadt-Helfrich effect and have a twisted nematic structure.

The liquid-crystal materials must have good chemical and thermal stability and good stability toward electrical fields and electromagnetic radiation. Furthermore, the liquid-crystal materials should have low viscosity and give short addressing times, low threshold voltages and high contrast in the cells. Furthermore, they should have a suitable mesophase, for example, for the abovementioned cells, a nematic or cholesteric mesophase, at customary operating temperatures, i.e. in the broadest possible range above and below room temperature. Since liquid crystals are generally used as mixtures of a plurality of components, it is important that the components are readily miscible with one another. Further properties, such as electrical conductivity, dielectric anisotropy and optical anisotropy, must meet various requirements depending on the cell type and the area of application. For example, materials for cells having a twisted nematic structure should have positive dielectric anisotropy and low electrical conductivity.

For example, the media desired for matrix liquid-crystal displays containing integrated nonlinear elements for switching individual image points (MLC displays) are those having high positive dielectric anisotropy, broad nematic phases, relatively low birefringence, very high specific resistance, good UV and temperature stability of the resistance and low vapour pressure.

Matrix liquid-crystal displays of this type are known. Examples of nonlinear elements which can be used to individually switch the individual image points are active elements (i.e. transistors). This is then referred to as an "active matrix", and a differentiation can be made between two types:
1. MOS (Metal Oxide Semiconductor) transistors on a silicon wafer as substrate.
2. Thin-film transistors (TFTs) on a glass plate as substrate.

The use of monocrystalline silicon as the substrate material limits the display size since even the modular assembly of various part displays results in problems at the Joints.

In the case of the more promising type 2, which is preferred, the electrooptical effect used is usually the TN effect. A differentiation is made between two technologies: TFTs comprising compound semiconductors, such as, for example, CdSe, or TFTs based on polycrystalline or amorphous silicon. Intensive research efforts are being made worldwide in the latter technology. The TFT matrix is applied to the inside of one glass plate of the display, while the inside of the other glass plate carries the transparent counterelectrode. Compared with the size of the image point electrode, the TFT is very small and hardly affects the image at all. This technology can also be extended to fully colour-compatible image displays, where a mosaic of red, green and blue filters is arranged in such a manner that each filter element is located opposite a switchable image element.

The TFT displays usually operate as TN cells with crossed polarizers in transmission and are illuminated from the back.

The term MLC displays here covers any matrix display containing integrated nonlinear elements, i.e. in addition to the active matrix, also displays containing passive elements such as varistors or diodes (MIM=metal-insulator-metal).

MLC displays of this type are particularly suitable for TV applications (for example pocket TV sets) or for high-information displays for computer applications (laptops) and in automobile or aircraft construction. In addition to problems with respect to the angle dependency of the contrast and the switching times, problems result in MLC displays due to inadequate specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288, Matrix LCD Controlled by Double Stage Diode Rings, p. 141 ff., Paris; STROMER, M., Proc. Eurodisplay 84, September 1984: Design of Thin Film Transistors for Matrix Adressing [sic] of Television Liquid Crystal Displays, p. 145 ff., Paris]. As the resistance decreases, the contrast of an MLC display worsens and the problem of "after image elimination" may occur. Since the specific resistance of the liquid-crystal mixture generally decreases over the life of an MLC display due to interaction with the internal surfaces of the display, a high (initial) resistance is very important to give acceptable service lives. In particular, in the case of low-voltage mixtures, it was hitherto not possible to achieve very high specific resistances. It is furthermore important that the specific resistance increases as little as possible with increasing temperature and after heating and/or exposure to UV radiation. The MLC displays of the prior art do not satisfy current demands.

It was hitherto possible to prepare liquid-crystalline media with values for birefringence and phase range (e.g. clearing point: >70°) which are required for practical use, but only with threshold voltages of about 1.8 volts, if value is placed on values of about 98% for the holding ratio under extreme conditions (e.g. after exposure to UV).

Thus, there continues to be a great demand for MLC displays of very high specific resistance and at the same time a broad operating temperature range, short switching times and low threshold voltage which do not have these disadvantages or only do so to a lesser extent.

For TN (Schadt-Helfrich) cells, media are desired which facilitate the following advantages in the cells:

broadened nematic phase range (in particular down to low temperatures), switchability at extremely low temperatures (outdoor use, automobiles, avionics), increased stability to UV radiation (longer life).

The media available from the prior art do not make it possible to achieve these advantages whilst simultaneously retaining the other parameters.

For supertwisted (STN) cells, media are desired which facilitate a greater multiplexing ability and/or lower threshold voltages and/or broader nematic phase ranges (in particular at low temperatures). To this end, a further extension of the parameter latitude available (clearing point, smectic-nematic transition or melting point, viscosity, dielectric values, elastic values) is urgently desired.

SUMMARY OF THE INVENTION

The invention has the object of providing media, in particular for MLC, TN or STN displays of this type, which do not have the abovementioned disadvantages or only do so to a lesser extent, and preferably at the same time have very high specific resistances and low threshold voltages.

It has now been found that this object can be achieved if media according to the invention are used in displays.

The invention thus relates to a liquid-crystalline medium based on a mixture of polar compounds having positive dielectric anisotropy, characterized in that it contains one or more compounds of the general formula I

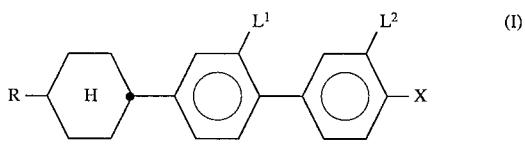

in which X is fluorine, chlorine, $CF_3$, $OCF_3$ or $OCHF_2$, one of the radicals $L^1$ and $L^2$ is fluorine, the other radical $L^1$ or $L^2$ is hydrogen and R is alkyl, oxaalkyl, fluoroalkyl or alkenyl, in each case having up to 7 carbon atoms.

The invention also relates to electrooptical displays (in particular STN or MLC displays having two plane-parallel outer plates which, together with a frame, form a cell, integrated nonlinear elements for switching individual image points on the outer plates, and a nematic liquid-crystal mixture of positive dielectric anisotropy and high specific resistance located in the cell) which contain media of this type, and to the use of these media for electrooptical purposes.

The liquid-crystal mixtures according to the invention facilitate a significant broadening of the parameter latitude available.

The achievable combinations of clearing point, viscosity at low temperature, thermal and UV stability and dielectric anisotropy are far superior to previous materials from the prior art.

The requirement for a high clearing point, a nematic phase at −40° C. and a high Δε was previously only achievable to an unsatisfactory extent. Although systems such as, for example, ZLI-3119 have a comparable clearing point and comparatively favorable viscosities, they have, however, a Δε of only +3.

Other mixture systems have comparable viscosities and values of Δε, but only have clearing points in the region of 60° C.

The liquid-crystal mixtures according to the invention make it possible to achieve, at low viscosities at low temperatures (at −30° C.<600, preferably <550 mPa. S [sic]; at −40° C.<1800, preferably <1700 mPa.s), simultaneously dielectric anisotropy values Δε>3.5, preferably >4.0, clearing points above 65°, preferably above 70°, and a high value for the specific resistance, which means that excellent STN and MCL [sic] displays can be achieved.

It goes without saying that a suitable choice of the components of the mixtures according to the invention also allows higher clearing points (for example above 90°) to be achieved at higher threshold voltages or lower clearing points to be achieved at lower threshold voltages while retaining the other advantageous properties. The MLC displays according to the invention preferably operate in the first transmission minimum of Gooch and Tarry C. H. Gooch and H. A. Tarry, Electron. Lett. 10, 2–4, 1974; C. H. Gooch and H. A. Tarry, Appl. Phys., Vol. 8, 1575–1584, 1975, in this case, a lower dielectric anisotropy in the second minimum is sufficient in addition to particularly favorable electrooptical properties, such as, for example, high gradient of the characteristic line and low angle dependency of the contrast (German Patent 30 22 818) at the same threshold voltage as in an analogous display. This allows significantly higher specific resistances to be achieved in the first minimum using the mixtures according to the invention than using mixtures containing cyano compounds. A person skilled in the art can use simple routine methods to produce the birefringence necessary for a prespecified cell thickness of the MLC display by a suitable choice of the individual components and their proportions by weight.

The viscosity at 20° C. is preferably <25 mPa.s. The nematic phase range is preferably at least 70°, in particular at least 80°. This range preferably extends at least from −30° to +70°.

Measurements of the "capacity holding ration [sic]" (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention containing compounds of the formula I exhibit a considerably smaller decrease in the HR with increasing temperature than do analogous mixtures in which the compounds of the formula I are replaced by cyanophenylcyclohexanes of the formula

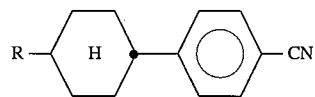

The UV stability of the mixtures according to the invention is also considerably better, i.e. they exhibit a significantly smaller decrease in the HR on exposure to UV radiation.

The media according to the invention are distinguished by extremely high elastic constants at very favorable viscosity values in addition to an unusually broad nematic phase range, resulting, in particular when used in STN displays, in significant advantages over prior-art media.

The media according to the invention are preferably based on a plurality (preferably two or more) of compounds of the formula I, i.e. the proportion of these compounds is >25%, preferably >40%.

The individual compounds of the formulae I to XII and their sub-formulae which can be used in the media according to the invention are either known or can be prepared analogously to the known compounds.

Preferred embodiments are indicated below:

a medium additionally contains one or more compounds selected from the group comprising the general formulae II, III and IV:

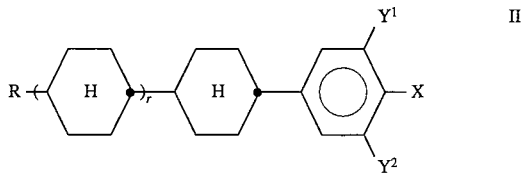

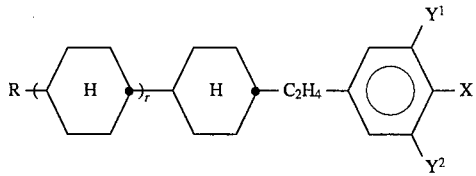  III

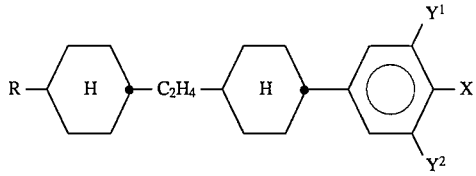  IV in which the individual radicals are as defined below:
R: alkyl, oxaalkyl, fluoroalkyl or alkenyl, in each case having up to 7 carbon atoms
X: F, Cl, $CF_3$ or $OCHF_2$,
$Y^1$ and $Y^2$: in each case H or F
r: 0 or 1.

a medium additionally contains one or more compounds selected from the group comprising the general formulae V to VIII:

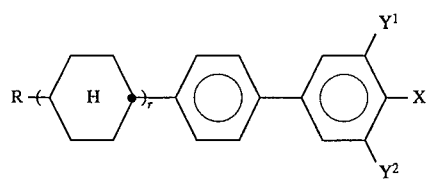  V

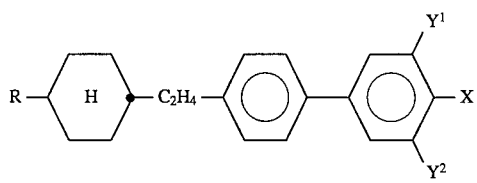  VI

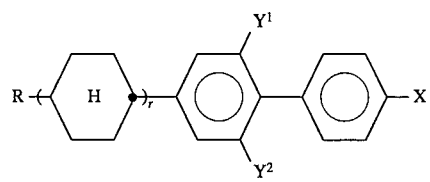  VII

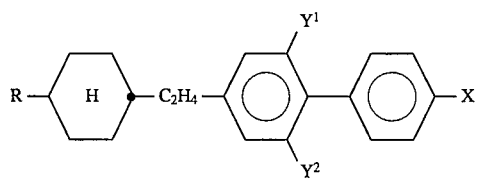  VIII in which R, r, X, $Y^1$ and $Y^2$ are each, independently of one another.

a medium additionally contains one or more compounds selected from the group comprising the general formula [sic] IX to XII:

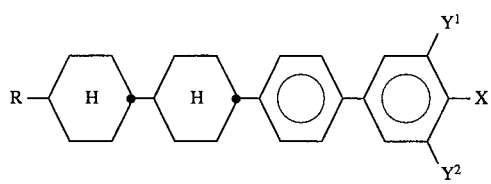  IX

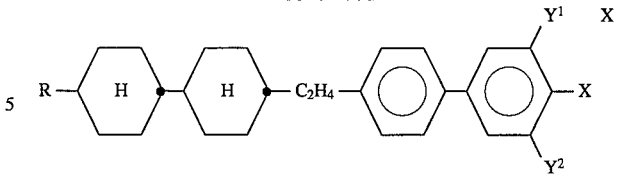  X

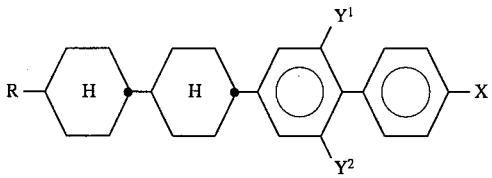  XI

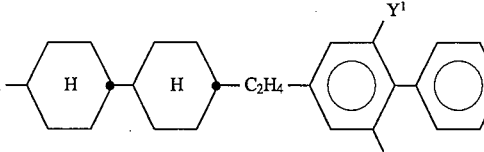  XII in which R, X, are each, independently of one another.

The proportion of compounds of the formulae I to IV together is at least 50% by weight in the total mixture the proportion of compounds of the formula I is from 10 to 50% by weight in the total mixture the proportion of compounds of the formulae II to IV is from 30 to 70% by weight in the total mixture

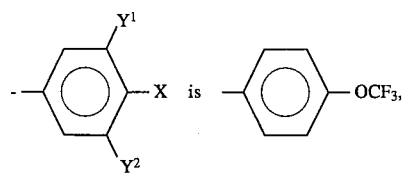

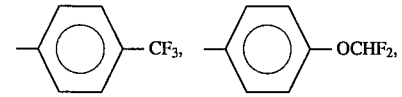

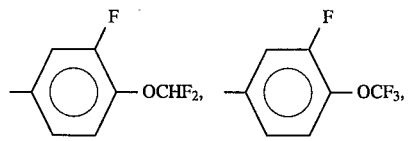

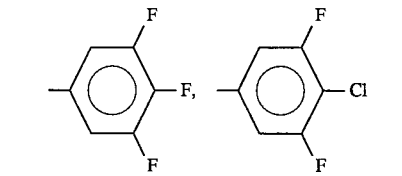

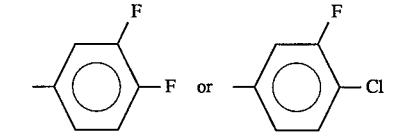

the medium contains compounds of the formulae II and III or IV

R is straight-chain alkyl or alkenyl having 2 to 7 carbon atoms the medium essentially comprises compounds of the formulae I to IV the medium contains further compounds, preferably selected from the following group (Y=H or F, preferably F):

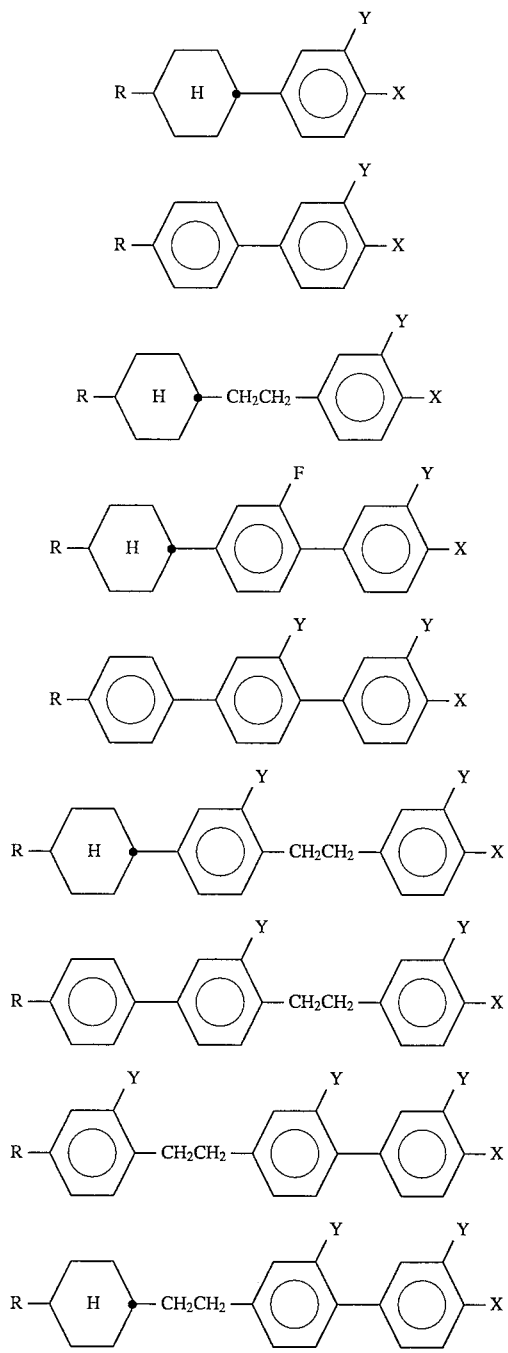

The I: (II+III+IV) weight ratio is preferably from 1:4 to 1:1.

The medium essentially comprises compounds selected from the group comprising the general formulae I to XII.

It has been found that even a relatively small proportion of compounds of the formula I mixed with conventional liquid-crystal materials, but in particular containing one or more compounds of the formula II, III and/or IV, results in a significant improvement in the addressing times and in low threshold voltages, and at the same time broad nematic phases with low smectic-nematic transition temperatures are observed. The compounds of the formulae I to IV are colorless, stable and readily miscible with one another and with other liquid-crystal materials.

The term "alkyl" covers straight-chain and branched alkyl groups having 1–7 carbon atoms, in particular the straight-chain groups methyl, ethyl, propyl, butyl, pentyl, hexyl and heptyl. Group [sic] having 2–5 carbon atoms are generally preferred.

The term "alkenyl" covers straight-chain and branched alkenyl groups having 2–7 carbon atoms, in particular the straight-chain groups. Preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups containing terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. n is preferably 1 and m is preferably from 1 to 6.

Through a suitable choice of the meanings of R, X and Y, the addressing times, the threshold voltage, the gradient of the transmission characteristic lines, etc., can be modified as desired. For example, 1E-alkenyl radicals, 3E-alkenyl radicals, 2E-alkenyloxy radicals and the like generally give shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. A —$CH_2CH_2$— group in $Z^1$ or $Z^2$ generally results in higher values of $k_{33}/k_{11}$ compared with a simple covalent bond. Higher values of $k_{33}/k_{11}$ facilitate, for example, flatter transmission characteristic lines in TN cells with a 90° twist (for achieving gray tones) and steeper transmission characteristic lines in STN, SBE and OMI cells (greater multiplexing ability), and vice versa.

The optimum mixing ratios of the compounds of the formulae I and II+III+IV depends substantially on the desired properties, on the choice of the components of the formulae I, II, III and/or IV and on the choice of any other components which may be present. Suitable mixing ratios within the abovementioned range can easily be determined from case to case.

The total amount of compounds of the formulae I to XII in the mixtures according to the invention is not crucial. The mixtures may therefore contain one or more further components in order to optimize various properties. However, the effect observed on the addressing times and the threshold voltage is generally greater the higher the total concentration of compounds of the formulae I to XII.

In a particularly preferred embodiment, the media according to the invention contain compounds of the formula II, III, V and/or VII (preferably II and/or III) in which X is $CF_3$, $OCF_3$ or $OCHF_2$. A favorable synergistic effect with the compounds of the formula I results in particularly advantageous properties.

For STN applications, the media preferably contain compounds selected from the group comprising the formulae V to VIII in which X is preferably $OCHF_2$.

The media according to the invention may furthermore contain a component A comprising one or more compounds of the general formula I' having a dielectric anisotropy of from −1.5 to +1.5

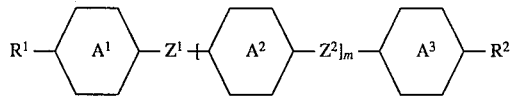

in which $R^1$ and $R^2$ are each, independently of one another, n-alkyl, n-alkoxy, ω-fluoroalkyl or n-alkenyl having up to 9 carbon atoms, the rings $A^1$, $A^2$ and $A^3$ are each, independently of one another, 1,4-phenylene, 2- or 3-fluoro-1,4-phenylene, trans-1,4-cyclohexylene or 1,4-cyclohexenylene, $Z^1$ and $Z^2$ are each, independently of one another, —$CH_2CH_2$—, C≡C—, —CO—O—, —O—CO— or a single bond, and m is 0, 1 or 2.

Component A preferably contains one or more compounds selected from the group comprising II1 to II7:

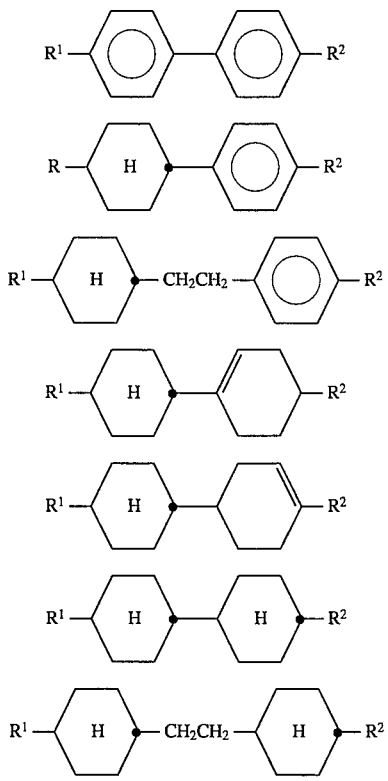

in which $R^1$ and $R^2$ are as defined under formula I'.

Component A preferably additionally contains one or more compounds selected from the group comprising II8 to II20:

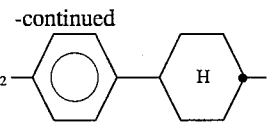

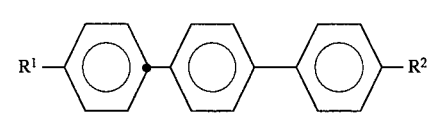

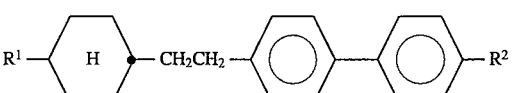

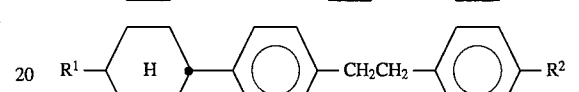

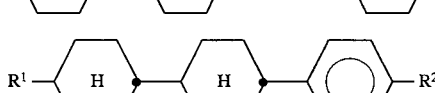

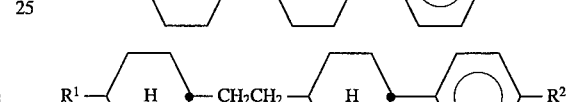

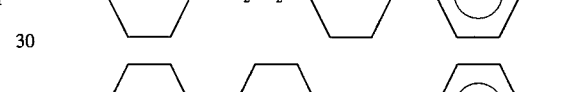

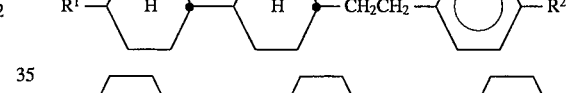

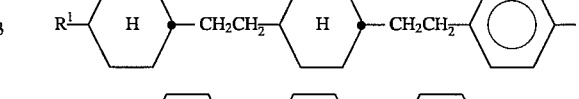

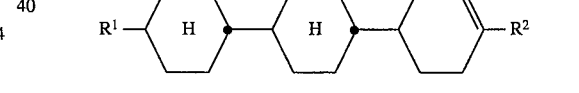

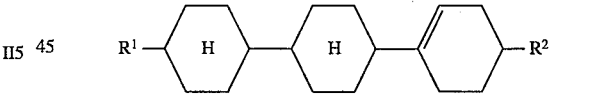

in which $R^1$ and $R^2$ are as defined under formula I', and the 1,4-phenylene groups in II8 to II17 may each, independently of one another, also be monosubstituted or polysubstituted by fluorine.

Furthermore, component A preferably additionally contains one or more compounds selected from the group comprising II21 to II25 contains [sic]:

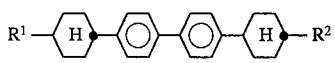

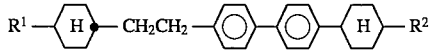

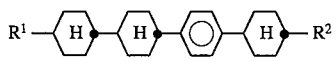

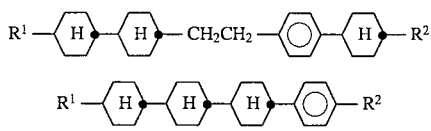

II24

II25 in which $R^1$ and $R^2$ are as defined under formula I', and the 1,4-phenylene groups in II21 to II25 may also each, independently of one another, be monosubstituted or polysubstituted by fluorine.

Finally, preferred mixtures of this type are those in which component A contains one or more compounds selected from the group comprising II26 and II27:

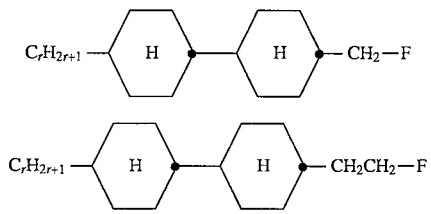

II26

II27 in which $C_rH_{2r+1}$ is a straight-chain alkyl group having up to 7 carbon atoms.

In some cases, the addition of compounds of the formula

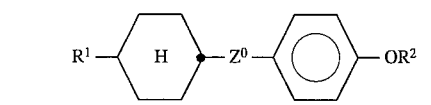

in which
$R^1$ and $R^2$ are as defined under formula I'
and
$Z^0$ is a single bond, —$CH_2CH_2$—,

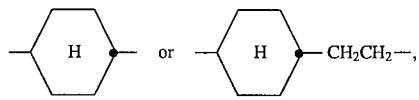

proves advantageous for suppressing smectic phases, although this may reduce the specific resistance. In order to achieve parameter combinations which are ideal for the application, a person skilled in the art can easily determine whether and, if yes, in what amount these compounds may be added. Normally, less than 15%, in particular 5–10%, are used.

Preference is also given to liquid-crystal mixtures which contain one or more compounds selected from the group comprising III' and IV':

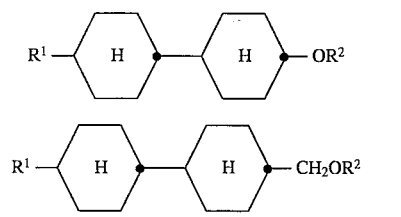

III'

IV' in which $R^1$ and $R^2$ are as defined under formula I'.

The type and amount of the polar compounds having positive dielectric anisotropy is not crucial per se. A person skilled in the art can use simple routine experiments to select suitable materials from a wide range of known and, in many cases, also commercially available components and base mixtures. The media according to the invention preferably contain one or more compounds of the formula I"

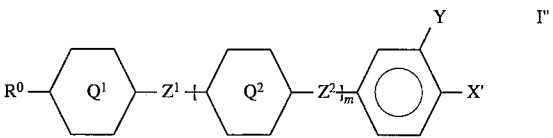

I"

in which $Z^1$, $Z^2$ and m are as defined under the formula I', $Q^1$ and $Q^2$ are each, independently of one another, 1,4-phenylene, trans-1,4-cyclohexylene or 3-fluoro-1,4-phenylene-, and one of the radicals $Q^1$ and $Q^2$ is alternatively trans-1,3-dioxane-2,5-diyl, pyrimidine-2,5-diyl, pyridine-2,5-diyl or 1,4-cyclohexenylene, $R^0$ is n-alkyl, n-alkenyl, n-alkoxy or n-oxaalkyl, in each case having up to 9 carbon atoms, Y is H or F and X' is CN, halogen, $CF_3$, $OCF_3$ or $OCHF_2$.

In a preferred embodiment, the media according to the invention for STN or TN applications are based on compounds of the formula I" in which X' is CN. It goes without saying that smaller or larger proportions of other compounds of the formula I" (X'≠CN) are also possible. For MLC applications, the media according to the invention preferably contain only up to about 10% of nitriles of the formula I" (but preferably no nitriles of the formula I", but instead compounds of the formula I' where X'=halogen, $CF_3$, $OCF_3$ or $OCHF_2$). These media are preferably based on the compounds of the formulae II to XII.

The construction of the STN and MLC displays according to the invention from polarizers, electrode base plates and electrodes with surface treatment corresponds to the construction which is conventional for displays of this type. The term conventional construction here is widely drawn and also covers all derivatives and modifications of the MLC display, in particular also matrix display elements based on poly-Si TFTs or MIMs.

An essential difference between the displays according to the invention and those customary hitherto based on the twisted nematic cell is, however, the choice of liquid-crystal parameters in the liquid-crystal layer.

The liquid-crystal mixtures which can be used according to the invention are prepared in a manner which is conventional per se. In general, the desired amount of the components used in the lesser amount is dissolved in the components making up the principal constituent, expediently at elevated temperature. It is also possible to mix solutions of the components in an organic solvent, for example in acetone, chloroform or methanol, and, after thorough mixing, to remove the solvent again, for example by distillation.

The dielectrics may also contain other additives known to those skilled in the art and described in the literature. For example, 0–15% of pleochroic dyes or chiral dopes can be added.

C denotes a crystalline phase, S a smectic phase, $S_B$ a smectic B phase, N a nematic phase and I the isotropic phase.

$V_{10}$ denotes the voltage for 10% transmission (view angle perpendicular to the plate surface). $t_{on}$ denotes the switch-on time and $t_{off}$ the switch-off time at an operating voltage corresponding to 2.5 times the value of $V_{10}$. $\Delta n$ denotes the optical anisotropy and no the refractive index. $\Delta\epsilon$ denotes the dielectric anisotropy ($\Delta\epsilon=\epsilon_{\parallel}-\epsilon_{\perp}$, where $\epsilon_{\parallel}$ is the dielectric constant parallel to the longitudinal molecular axes and $\epsilon_{\perp}$ is the dielectric constant perpendicular thereto. The electrooptical data were measured in a TN cell at the 1st minimum (i.e. at a d·$\Delta n$ value of 0.5) at 20° C., unless expressly stated otherwise. The optical data were measured at 20° C., unless expressly stated otherwise.

The examples below are intended to illustrate the invention without representing a limitation. Above and below all temperatures are given in °C. The percentages are percent by weight.

In the present application and in the examples below, the structures of the liquid-crystal compounds are indicated by acronyms, with the transformation into chemical formulae taking place in accordance with Tables A and B below. All radical [sic] $C_nH_{2n+1}$ are straight-chain alkyl radicals containing n or m carbon atoms. The coding in Table B is self-evident. In Table A, only the acronym for the base structure is given. In individual cases, the acronym for the base structure is followed, separated by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |
| n | $C_nH_{2n+1}$ | CN | H | H | H |
| nN.F | $C_nH_{2n+1}$ | CN | H | F | H |
| nF | $C_nH_{2n+1}$ | F | H | H | H |
| nOF | $OC_nH_{2n+1}$ | F | H | H | H |
| nCl | $C_nH_{2n+1}$ | Cl | H | H | H |
| nF.F | $C_nH_{2n+1}$ | F | H | F | H |
| nOmFF | $C_nH_{2n+1}$ | $OC_mH_{2m+1}$ | F | F | H |
| nmF | $C_nH_{2n+1}$ | $C_mH_{2m+1}$ | F | H | H |
| nCF$_3$ | $C_nH_{2n+1}$ | $CF_3$ | H | H | H |
| nOCF$_3$ | $C_nH_{2n+1}$ | $OCF_3$ | H | H | H |
| nOCF$_2$ | $C_nH_{2n+1}$ | $OCHF_2$ | H | H | H |
| nS | $C_nH_{2n+1}$ | NCS | H | H | H |
| rVsN | $C_rH_{2r+1}$—CH=CH—$C_sH_{2s}$— | CN | H | H | H |
| rEsN | $C_rH_{2r+1}$—O—$C_sH_{2s}$— | CN | H | H | H |
| nNF | $C_nH_{2n+1}$ | CN | F | H | H |
| nAm | $C_nH_{2n+1}$ | $COOC_mH_{2m+1}$ | H | H | H |
| nF.F.F | $C_nH_{2n+1}$ | F | H | F | F |
| nCl.F.F | $C_nH_{2n+1}$ | Cl | H | F | F |
| nCF$_3$.F.F | $C_nH_{2n+1}$ | $CF_3$ | H | F | F |
| nOCF$_3$.F.F | $C_nH_{2n+1}$ | $OCF_3$ | H | F | F |
| nOCF$_2$.F.F | $C_nH_{2n+1}$ | $OCHF_2$ | H | F | F |
| nOCF$_3$.F | $C_nH_{2n+1}$ | $OCF_3$ | H | F | H |

TABLE A

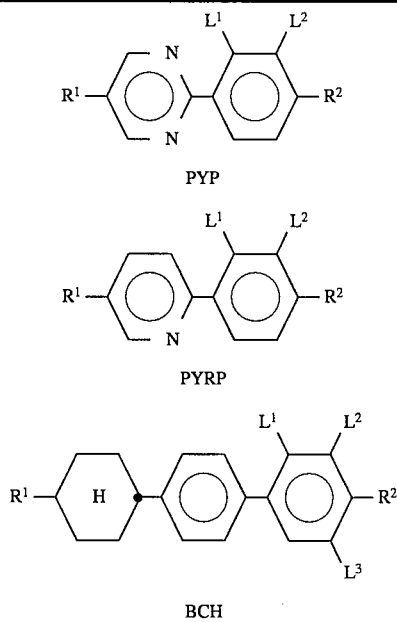

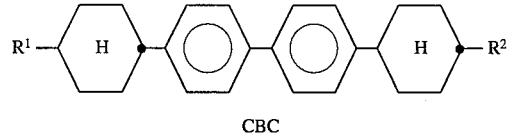

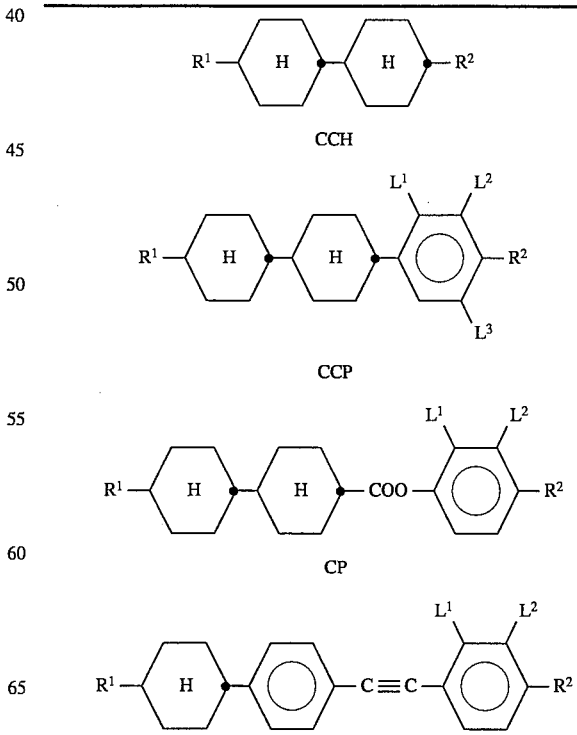

TABLE A-continued
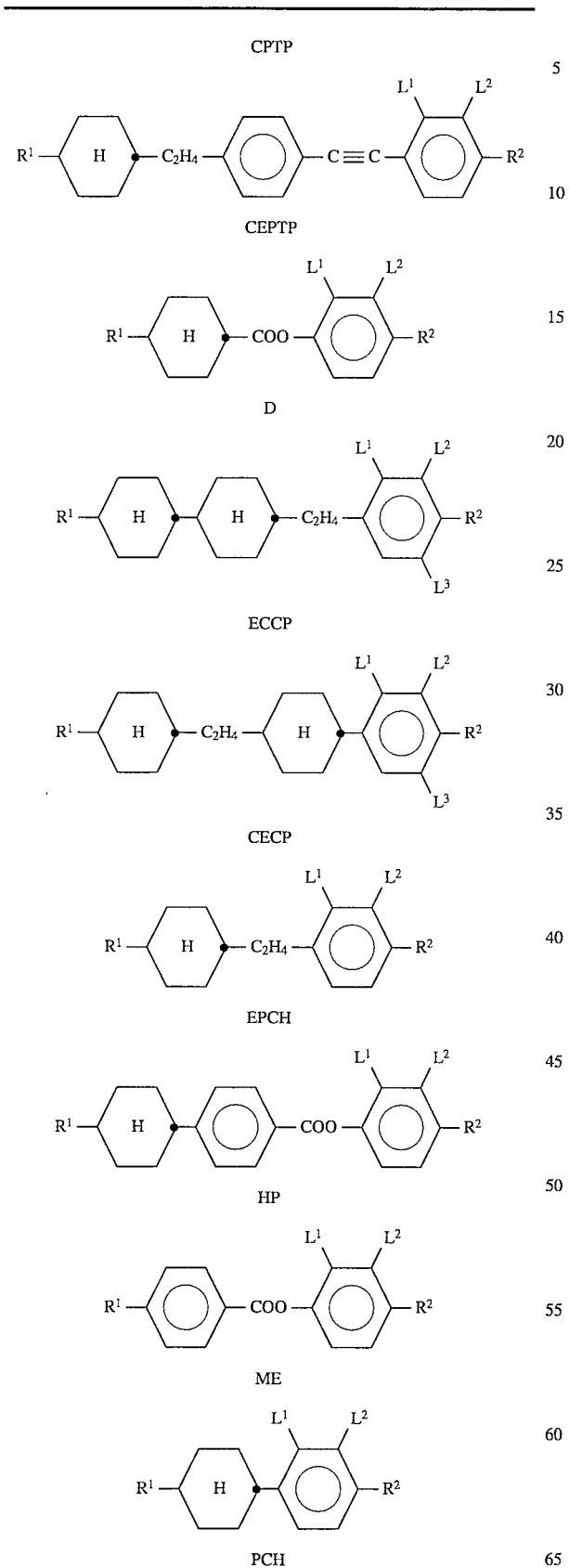
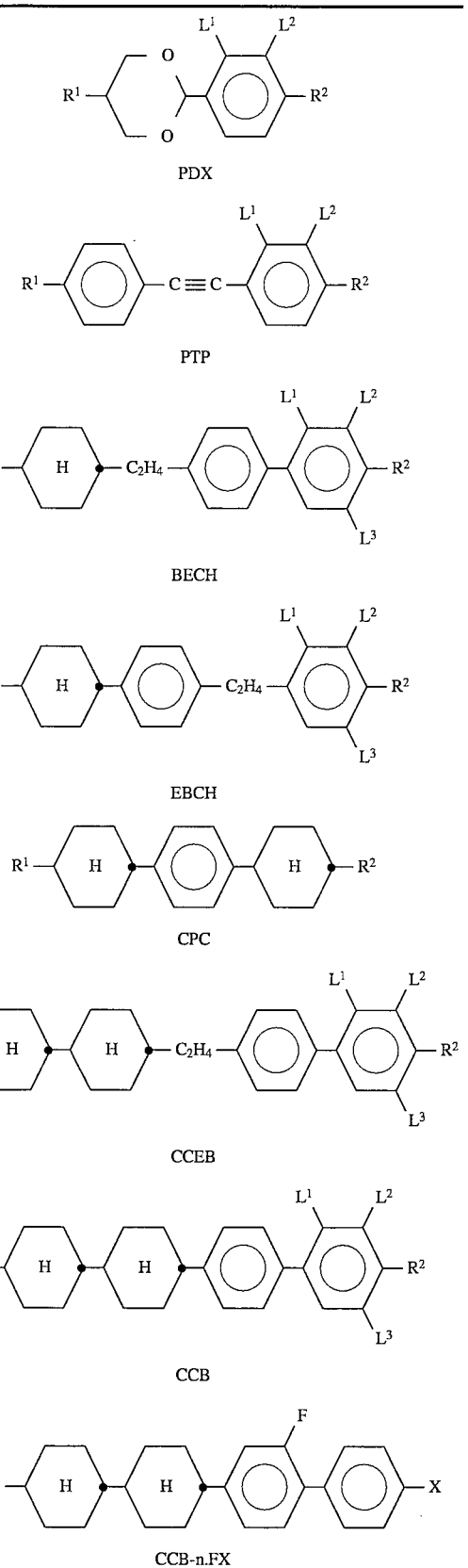

5,616,284
TABLE A-continued
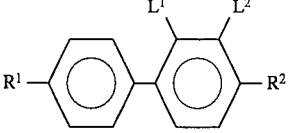
B
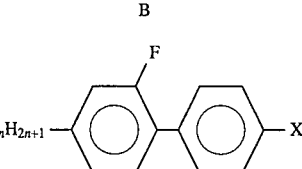
B-n.FX
TABLE B
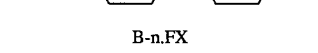
T15
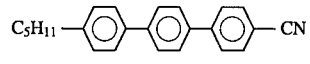
K3n
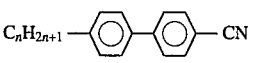
M3n
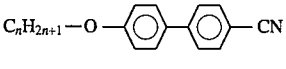
BCH-n.FX
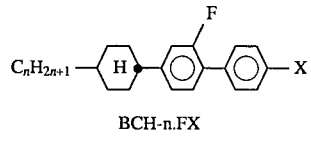
Inm
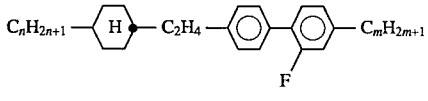
C-nm
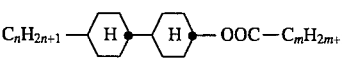
C15
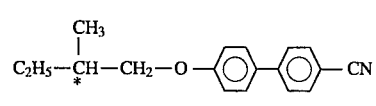
CB15
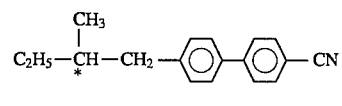
CBC-nmF
TABLE B-continued
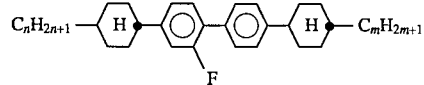
CCN-nm
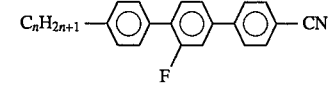
CCPC-nm
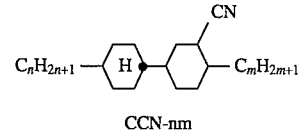
CH-nm
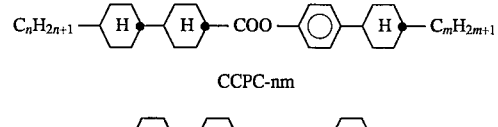
HD-nm
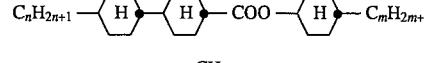
HH-nm
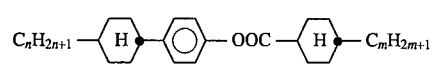
NCB-nm
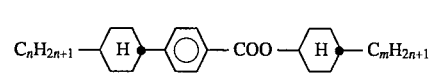
OS-nm
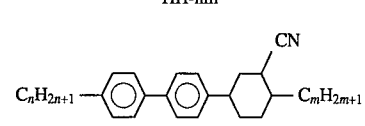
CHE
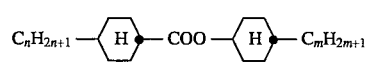
ECBC-nm
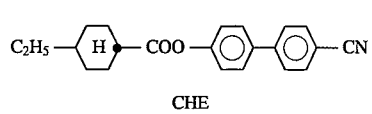
ECCH-nm
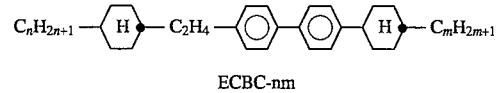
CCH-n1Em
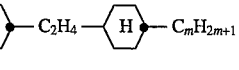
T-nFn
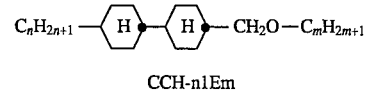
CCH-n2CF3
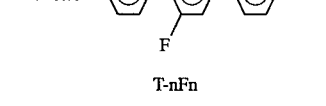

TABLE B-continued

CCP-nF.F.F.

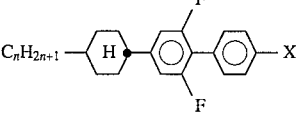

CuP-nX

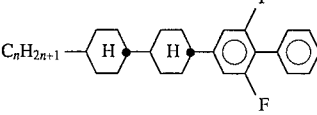

CCuP-nX

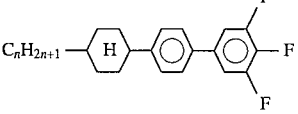

BCH-nF.F.F.

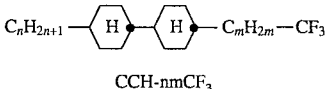

CCH-nmCF₃

| EXAMPLES | |
|---|---|
| Example 1 | |
| PCH-3 | 5% |
| PCH-5F | 10% |
| PCH-6F | 10% |
| PCH-7F | 8% |
| BCH-3.FCl | 11% |
| BCH-5.FCl | 10% |
| CCP-20CF₃ | 8% |
| CCP-30CF₃ | 12% |
| CCP-40CF₃ | 6% |
| CCP-50CF₃ | 10% |
| CCPC-33 | 3% |
| CCPC-34 | 4% |
| CCPC-35 | 3% |
| Example 2 | |
| PCH-5Cl | 10% |
| PCH-3Cl.F | 8% |
| PCH-5Cl.F | 8% |
| CCP-20CF₂.F | 10% |
| CCP-30CF₂.F | 12% |
| CCP-50CF₂.F | 12% |
| BCH-3.FF | 6% |
| BCH-3.FCF₃ | 8% |
| BCH-3F.F | 10% |
| CCB-2F.F | 3% |
| CCB-3F.F | 3% |
| CBC-33F | 3% |
| CCB-53F | 4% |
| CBC-55F | 3% |
| Example 3 | |
| PCH-5F | 10% |
| PCH-7F | 15% |
| EPCH-7F.F | 5% |
| EPCH-5F.F | 5% |
| CCP-20CF₃ | 9% |
| CCP-30CF₃ | 12% |
| CCP-50CF₃ | 12% |

$T_c = 65°$ C.
$\Delta n = 0.10$
$V_{th} = 1.7$ V

| EXAMPLES | |
|---|---|
| BCH-3F.F | 13% |
| BCH-3OCF₂.F | 8% |
| BCH-3.FOCF₂ | 7% |
| CCB-3.FF | 4% |
| Example 4 | |
| B-3F.F | 10% |
| B-5F.F | 8% |
| PCH-3Cl | 8% |
| PCH-5Cl | 10% |
| CCP-2F.F | 10% |
| CCP-3F.F | 12% |
| CCP-5F.F | 12% |
| BCH-3.FCl | 8% |
| BCH-3.FCl | 10% |
| CCB-3.FF | 3% |
| CCB-5.FF | 3% |
| CCP-30CF₃ | 6% |
| Example 5 | |
| PCH-3Cl | 12% |
| PCH-5Cl | 10% |
| PCH-3Cl.F | 10% |
| BECH-3F.F | 8% |
| CCP-2F.F | 8% |
| CCP-3F.F | 12% |
| CCP-5F.F | 12% |
| CCB-3.FF | 3% |
| CCB-5.FF | 3% |
| BCH-3F.F | 12% |
| BCH-5F.F | 10% |
| Example 6 | |
| B-3F.F | 8% |
| B-5F.F | 8% |
| PCH-3Cl | 10% |
| PCH-5Cl | 8% |
| CCP-2F.F | 10% |
| CCP-3F.F | 12% |
| ECCP-2F.F | 10% |
| ECCP-3F.F | 5% |
| CECP-2F.F | 8% |
| BCH-3F.F | 12% |
| CBC-33F | 3% |
| CBC-53F | 3% |
| CBC-55F | 3% |
| Example 7 | |
| B-3Cl.F | 8% |
| B-5Cl—F | 10% |
| PCH-5F | 10% |
| PCH-7F | 10% |
| CCP-20CF₃ | 12% |
| CECP-30CF₃ | 8% |
| ECCP-2F.F | 8% |
| ECCP-3F.F | 12% |
| BCH-3.FCl | 10% |
| BCH-5.FCl | 10% |
| CBC-33F | 2% |
| Example 8 | |
| EPCH-3F.F | 10% |
| EPCH-5F.F | 8% |
| B-3F.F | 8% |
| B-5F.F | 7% |
| CCP-2F.F | 15% |
| CCP-3F.F | 12% |
| CCP-5F.F | 12% |
| BCH-3F.F | 10% |
| BCH-5F.F | 10% |
| CCEB-3F.F | 4% |
| CCEB-5F.F | 4% |
| Example 9 | |
| EPCH-3Cl.F | 5% |
| EPCH-5Cl.F | 5% |
| PCH-5F | 11% |

$F_c$ [sic] $= 66°$ C.
$\Delta n = 0.08$
$\eta_{20} = 14$ mPa · s

| | | |
|---|---|---|
| PCH-7F | 13% | $V_{th}$ = 1.6 V |
| CCP-2OCF$_3$ | 9% | |
| CCP-3OCF$_3$ | 12% | |
| CCP-4OCF$_3$ | 7% | |
| CCP-5OCF$_3$ | 12% | |
| BCH-3.FCF$_3$ | 5% | |
| BCH-5.FCF$_3$ | 5% | |
| CCB-2.FF | 3% | |
| BCH-5F.F | 13% | |
| Example 10 | | |
| PCH-5F | 5% | |
| PCH-3 | 8% | |
| EPCH-5F.F | 10% | |
| EPCH-7F.F | 10% | |
| CCP-2OCF$_2$.F | 8% | |
| CCP-3OCF$_2$.F | 13% | |
| CCP-4OCF$_2$.F | 6% | |
| CCP-5OCF$_2$.F | 12% | |
| BCH-32 | 6% | |
| BCH-52 | 6% | |
| CCPC-33 | 3% | |
| CCPC-34 | 3% | |
| CCPC-35 | 3% | |
| BCH-3F.F | 7% | |
| Example 11 | | |
| PCH-7F | 10% | |
| EPCH-5F.F | 9% | |
| EPCH-7F.F | 8% | |
| CCP-2OCF$_3$ | 9% | |
| CCP-3OCF$_3$ | 12% | |
| CCP-4OCF$_3$ | 7% | |
| CCP-5OCF$_3$ | 12% | |
| BCH-3F.F | 12% | |
| BCH-5F.F | 10% | |
| BCH-3.FCF$_3$ | 5% | |
| CCB-3.FF | 3% | |
| CCB-5.FF | 3% | |
| Example 12 | | |
| B-3OCF$_3$ | 8% | N 65 I |
| B-5OCF$_3$ | 13% | $\Delta n$ = 0.117 |
| B-7OCF$_3$ | 13% | $V_{10}$ = 1.68 Volt |
| CCP-2OCF$_3$ | 8% | |
| CCP-3OCF$_3$ | 13% | |
| CCP-4OCF$_3$ | 5% | |
| CCP-5OCF$_3$ | 12% | |
| BCH-3F.F | 14% | |
| BCH-5F.F | 14% | |
| Example 13 | | |
| PCH-3OCF$_2$ | 10% | |
| PCH-5OCF$_2$ | 8% | |
| PCH-5F | 10% | |
| PCH-6F | 5% | |
| PCH-7F | 5% | |
| CCP-2OCF$_2$.F | 8% | |
| CCP-3OCF$_2$.F | 12% | |
| CCP-4OCF$_2$.F | 7% | |
| CCP-5OCF$_2$.F | 10% | |
| BCH-3.FCl | 8% | |
| BCH-5.FCl | 8% | |
| CCB-2.FF | 3% | |
| CBC-33F | 3% | |
| CBC-53F | 3% | |
| Example 14 | | |
| PCH-3Cl | 10% | |
| PCH-5Cl | 10% | |
| B-3F.F | 6% | |
| B-5F.F | 6% | |
| CCP-2F.F | 8% | |
| CCP-3F.F | 12% | |
| CCP-5F.F | 12% | |
| BCH-3F.F | 14% | |
| BCH-5F.F | 10% | |
| CCEB-3F.F | 4% | |
| CCEB-5F.F | 4% | |
| CCB-3.FF | 2% | |
| CCB-5.FF | 2% | |
| Example 15 | | |
| PCH-3 | 9% | |
| PCH-3OCF$_2$ | 12% | |
| PCH-5OCF$_2$ | 10% | |
| PCH-3Cl.F | 8% | |
| ECCP-32 | 7% | |
| ECCP-33 | 7% | |
| BCH-3F.F | 15% | |
| CCPC-33 | 3% | |
| CCPC-34 | 3% | |
| CCPC-35 | 3% | |
| ECCP-3F.F | 13% | |
| ECCP-5F.F | 10% | |
| Example 16 | | |
| PCH-3Cl | 11% | $T_c$ = 80° C. |
| PCH-4Cl | 10% | $\Delta n$ = 0.10 |
| PCH-5Cl | 16% | $\eta$ = 14 cSt |
| CCP-2OCF$_3$ | 8% | $V_{th}$ = 1.6 V |
| CCP-3OCF$_3$ | 12% | |
| CCP-4OCF$_3$ | 7% | |
| CCP-5OCF$_3$ | 10% | |
| BCH-3F.F | 10% | |
| BCH-5F.F | 10% | |
| CCB-3.FF | 3% | |
| CCB-5.FF | 3% | |
| Example 17 | | |
| PCH-7F.F | 10% | |
| PCH-5F.F | 12% | |
| B-3F.F | 6% | |
| B-5F.F | 6% | |
| CCP-2F.F | 10% | |
| CCP-3F.F | 12% | |
| CCP-5F.F | 12% | |
| BCH-3F.F | 10% | |
| BCH-5F.F | 10% | |
| CCEB-3F.F | 3% | |
| CCEB-5F.F | 3% | |
| CBC-33F | 3% | |
| CBC-53F | 3% | |
| Example 18 | | |
| PCH-3Cl.F | 11% | $T_c$ = 71° C. |
| PCH-5Cl.F | 10% | $\Delta n$ = 0.09 |
| PCH-7F | 10% | $\eta$ = 18 mPa · s |
| CCP-2OCF$_3$ | 9% | $V_{th}$ = 1.6 V |
| CCP-3OCF$_3$ | 12% | |
| CCP-4OCF$_3$ | 7% | |
| CCP-5OCF$_3$ | 12% | |
| BCH-3F.F | 10% | |
| BCH-5F.F | 8% | |
| BCH-3.FCF$_3$ | 5% | |
| CCB-3.FF | 3% | |
| CCB-5.FF | 3% | |
| Example 19 | | |
| B-3F.F | 9% | |
| B-5F.F | 6% | |
| PCH-3Cl | 15% | |
| PCH-5Cl | 15% | |
| CCP-2F | 8% | |
| CCP-3F | 8% | |
| CCP-2F.F | 14% | |
| BCH-3F.F | 15% | |
| CCEB-3F.F | 5% | |
| CCEB-5F.F | 5% | |
| Example 20 | | |
| PCH-7Cl | 10% | |
| PCH-5Cl | 10% | |
| PCH-5Cl.F | 8% | |
| PCH-3OCF$_3$ | 6% | |
| PCH-5OCF$_3$ | 6% | |

EXAMPLES

| | | |
|---|---|---|
| CCP-2Cl | 8% | |
| CCP-3Cl | 8% | |
| CCP-5F | 12% | |
| BCH-3F.F | 15% | |
| BCH-5F.F | 7% | |
| CCB-3F.F | 3% | |
| CCB-5F.F | 3% | |
| CBC-33F | 4% | |
| Example 21 | | |
| PCH-5F | 7% | $T_c = 73°$ C. |
| PCH-7F | 15% | $\Delta n = 0.10$ |
| EPCH-5F.F | 7% | $V_{th} = 1.7$ V |
| EPCH-5Cl.F | 5% | |
| CCP-3F | 6% | |
| CCP-5F | 4% | |
| BCH-3F.F | 11% | |
| BCH-3OCF$_3$ | 11% | |
| CCB-3.FF | 4% | |
| CCP-2OCF$_3$ | 6% | |
| CCP-3OCF$_3$ | 12% | |
| CCP-5OCF$_3$ | 12% | |
| Example 22 | | |
| B-3F.F | 9% | |
| B-5F.F | 6% | |
| PCH-3Cl | 15% | |
| PCH-5Cl | 15% | |
| CCP-2F.F | 12% | |
| CCP-3F.F | 10% | |
| CCP-5F.F | 8% | |
| BCH-3F.F | 15% | |
| CCEB-3F.F | 5% | |
| CCEB-2F.F | 5% | |
| Example 23 | | |
| B-3Cl.F | 8% | |
| B-5Cl.F | 6% | |
| PCH-5F | 10% | |
| PCH-7F | 12% | |
| CCP-2Cl.F | 8% | |
| CCP-3Cl.F | 8% | |
| CCP-5Cl.F | 6% | |
| BCH-3.FCF$_3$ | 10% | |
| BCH-5.FCF$_3$ | 10% | |
| BCH-3.FCl | 7% | |
| CCB-2.FF | 5% | |
| CBC-33F | 5% | |
| CBC-53F | 5% | |
| Example 24 | | |
| PCH-5F | 11% | $T_c = 70°$ |
| PCH-7F | 12% | $\Delta n = 0.09$ |
| EPCH-5F.F | 5% | $V_{th} = 1.7$ V |
| EPCH-5Cl.F | 5% | |
| CCP-3Cl.F | 6% | |
| CCP-3F.F | 6% | |
| BCH-3F.F | 10% | |
| BCH-5F.F | 8% | |
| BCH-3OCF$_3$ | 5% | |
| CCB-3.FF | 4% | |
| CCP-2OCF$_3$ | 9% | |
| CCP-3OCF$_3$ | 12% | |
| CCP-4OCF$_3$ | 7% | |
| Example 25 | | |
| PCH-6F | 7.0% | $S < -30$ N 90 I |
| PCH-5F | 10.0% | $V_{10} = 2.02$ Volt |
| PCH-7F | 10.0% | $\Delta n = 0.1000$ |
| CCP-2OCF$_3$ | 6.0% | $\eta_{20} = 15$ mPa · s |
| CCP-3OCF$_3$ | 10.0% | |
| CCP-4OCF$_3$ | 6.0% | |
| CCP-5OCF$_3$ | 8.5% | |
| BCH-3F.F | 10.0% | |
| BCH-5F.F | 13.0% | |
| BCH-5.F2 | 3.0% | |
| CBC-33F | 3.0% | |
| CBC-53F | 3.0% | |
| CBC-55F | 3.0% | |
| ECCP-3OCF$_3$ | 8.5% | |
| BCH-5.F2: | H$_{11}$C$_5$—⟨cyclohexyl⟩—⟨phenyl-F⟩—⟨phenyl⟩—C$_2$H$_5$ | |
| Example 26 | | |
| PCH-5F | 10.0% | $S < -20$ N 93 I |
| PCH-6F | 8.0% | $V_{10} = 2.18$ Volt |
| PCH-7F | 7.0% | $\Delta n = 0.0827$ |
| CCP-2OCF$_3$ | 9.0% | $\eta_{20} = 14$ mPa · s |
| CCP-3OCF$_3$ | 12.0% | |
| CCP-4OCF$_3$ | 7.0% | |
| CCP-5OCF$_3$ | 11.0% | |
| BCH-3F.F | 4.0% | |
| ECCP-3F.F | 8.0% | |
| ECCP-5F.F | 8.0% | |
| ECCP-3OCF$_3$ | 5.0% | |
| ECCP-5OCF$_3$ | 5.0% | |
| CBC-33F | 2.0% | |
| CBC-53F | 2.0% | |
| CBC-55F | 2.0% | |
| Example 27 | | |
| Substance | mass-% | |
| PCH-3OCF$_3$ | 6.00 | $T_{(NI)} = 65°$ C. |
| PCH-5OCF$_3$ | 7.00 | $V_{20} = 19$ cSt |
| PCH-7OCF$_3$ | 4.00 | $\Delta n = 0.114$ |
| BCH-2F.F | 8.00 | $V_{10}$ (2nd) = 1.9 V |
| BCH-3F.F | 12.00 | |
| BCH-5F.F | 10.00 | |
| BCH-3OCF$_3$.F | 9.00 | |
| BCH-5OCF$_3$.F | 11.00 | |
| BCH-3F.F.F | 12.00 | |
| BCH-4F.F.F | 10.00 | |
| BCH-5F.F.F | 11.00 | |
| Example 28 | | |
| Substance | mass-% | |
| B-3F.F | 6.00 | $T_{(NI)} = 85°$ |
| B-5F.F | 7.00 | $V_{20} = 22$ cSt |
| BCH-2F.F | 8.00 | $\Delta n = 0.148$ |
| BCH-3F.F | 12.00 | $V_{10}$ (2nd) = 2.2 V |
| BCH-5F.F | 10.00 | |
| BCH-2CL.F.F | 5.00 | |
| BCH-3CL.F.F | 9.00 | |
| BCH-5CL.F.F | 11.00 | |
| BECH-3F.F | 11.00 | |
| BECH-4F.F | 10.00 | |
| BECH-5F.F | 11.00 | |
| Example 29 | | |
| Substance | mass-% | |
| PCH-5F | 10.00 | $T_{NI} = 111°$ C. |
| PCH-6F | 7.00 | $V_{20} = 21$ cSt |
| PCH-7F | 10.00 | $\Delta n = 0.143$ |
| BCH-3CL.F | 12.00 | $V_{10}$ (2nd) = 2.7 V |
| BCH-5CL.F | 10.00 | |
| BCH-2CL.F.F | 10.00 | |
| BCH-3CL.F.F | 14.00 | |
| BCH-5CL.F.F | 11.00 | |
| CCB-3F.F | 5.00 | |
| CCB-4F.F | 5.00 | |
| CCB-5F.F | 6.00 | |
| Example 30 | | |
| Substance | mass-% | |
| PCH-3F.F | 7.00 | $T_{(NI)} = 83°$ C. |
| PCH-5F.F | 6.00 | $V20 = 17$ cSt |
| CCP-2OCF$_3$.F | 11.00 | $\Delta n = 0.093$ |

EXAMPLES

| | | |
|---|---|---|
| CCP-3OCF₃.F | 12.00 | V₁₀ (1st) = 1.65 V |
| CCP-4OCF₃.F | 9.00 | |
| CCP-5OCF₃.F | 11.00 | |
| ECCP-2F.F | 9.00 | |
| ECCP-3F.F | 8.00 | |
| ECCP-5F.F | 6.00 | |
| BCH-3CF₃.F | 12.00 | |
| BCH-5CF₃.F | 9.00 | |
| Example 31 | | |
| Substance | mass-% | |
| PCH-5F | 7.00 | T$_{(N,I)}$ = 78° C. |
| PCH-6F | 4.00 | V₂₀ = 22 cSt |
| PCH-7F | 6.00 | Δn = 0.089 |
| CCP-2OCF₂.F.F | 9.00 | V₁₀ = 1.7 V |
| CCP-3OCF₂.F.F | 11.00 | |
| CCP-5OCF₂.F.F | 12.00 | |
| CCP-2CL.F.F | 10.00 | |
| CCP-3CL.F.F | 9.00 | |
| CCP-5CL.F.F | 11.00 | |
| BCH-3OCF₃.F | 12.00 | |
| BCH-5OCF₃.F | 9.00 | |
| Example 32 | | |
| Substance | mass-% | |
| PCH-5CL.F | 5.00 | T$_{(NI)}$ = 76° C. |
| PCH-7CL.F | 6.00 | Δn = 0.098 |
| CCP-2CF₃.F.F | 8.00 | V₁₀ (1st) = 1.58 V |
| CCP-3CF₃.F.F | 10.00 | |
| CCP-5CF₃.F.F | 8.00 | |
| CCP-2CL.F.F | 14.00 | |
| CCP-3CL.F.F | 12.00 | |
| CCP-5CL.F.F | 12.00 | |
| BCH-3F.F | 15.00 | |
| BCH-5F.F | 10.00 | |
| Example 33 | | |
| Substance | mass-% | |
| PCH-5F | 7.00 | T$_{(N,I)}$ = 83° C. |
| PCH-7F | 6.00 | V₂₀ = 16 cSt |
| CECP-2F.F | 9.00 | Δn = 0.093 |
| CECP-3F.F | 12.00 | V₁₀ (1st) = 1.65 V |
| CECP-4F.F | 8.00 | |
| CECP-5F.F | 12.00 | |
| CUP-3OCF₃ | 10.00 | |
| CUP-5OCF₃ | 12.00 | |
| BCH-3OCF₃.F | 14.00 | |
| BCH-5OCF₃.F | 10.00 | |
| Example 34 | | |
| PCH-5F | 6.00 | T$_{(NI)}$ = 105° C. |
| PCH-7F | 6.00 | V₂₀ = 18 cSt |
| CECP-2 OCF3 | 9.00 | V₁₀ (1st) = 2.2 V |
| CECP-3 OCF3 | 12.00 | Δn = 0.094 |
| CECP-5 OCF3 | 11.00 | |
| CUP-3OCF3 | 12.00 | |
| CUP-5OCF3 | 12.00 | |
| BCH-3OCF3.F | 11.00 | |
| BCH-5OCF3.F | 12.00 | |
| CCUP-3OCF3 | 4.00 | |
| CCUP-5OCF3 | 5.00 | |
| Example 35 | | |
| Substance | mass-% | |
| PCH-4OCF3 | 6.00 | T$_{(N,I)}$ = 66° C. |
| PCH-5OCF3 | 7.00 | V₂₀ = 20 cSt |
| PCH-3OCF3 | 4.00 | Δn = 0.112 |
| BCH-2F.F | 8.00 | V₁₀ (2nd) = 1.95 V |
| BCH-3F.F | 12.00 | |
| BCH-5F.F | 10.00 | |
| BCH-5.FOCF3 | 11.00 | |
| BCH-3F.F.F | 12.00 | |
| BCH-4F.F.F | 10.00 | |
| BCH-4F.F.F | 11.00 | |
| BCH-3.FOCF₃ | 9.00 | |
| Example 36 | | |
| Substance | mass-% | |
| PCH-3OCF3 | 6.00 | T$_{(N,I)}$ = 62° C. |
| PCH-5OCF3 | 7.00 | Δn = 0.116 |
| PCH-3OCF3 | 4.00 | V = 22 cSt |
| BCH-2F.F | 8.00 | V₁₀ (2nd) = 1.8 V |
| BCH-3F.F | 12.00 | |
| BCH-5F.F | 10.00 | |
| BCH-3.FCF3 | 9.00 | |
| BCH-5.FCF3 | 11.00 | |
| BCH-3F.F.F | 12.00 | |
| BCH-4F.F.F | 10.00 | |
| BCH-5F.F.F | 11.00 | |
| Example 37 | | |
| Substance | mass-% | |
| B-3.FCL | 6.00 | T$_{(N,I)}$ = 83° C. |
| B-5.FCL | 7.00 | V = 23 cSt |
| BCH-2F.F | 8.00 | Δn = 0.158 |
| BCH-3F.F | 12.00 | V₁₀ (2nd) = 2.3 V |
| BCH-5F.F | 10.00 | |
| BCH-2CL.F.F | 5.00 | |
| BCH-3CL.F.F | 9.00 | |
| BCH-5CL.F.F | 11.00 | |
| BECH-3F.F | 11.00 | |
| BECH-4F.F | 10.00 | |
| BECH-5F.F | 11.00 | |
| Example 38 | | |
| Substance | mass-% | |
| PCH-5F | 7.00 | T$_{(N,I)}$ = 86° C. |
| PCH-6F | 4.00 | V = 18 cSt |
| PCH-7F | 6.00 | Δn = 0.092 |
| CCP-2OCF3 | 9.00 | V₁₀ = 1.96 V |
| CCP-3OCF3 | 11.00 | |
| CCO-5OCF3 | 12.00 | |
| CCP-2CL.F.F | 10.00 | |
| CCP-3CL.F.F | 9.00 | |
| CCP-5CL.F.F | 11.00 | |
| BCH-3.FOCF3 | 12.00 | |
| BCH-5.FOCF₃ | 9.00 | |
| Example 39 | | |
| Substance | mass-% | |
| PCH-5F | 10.00 | T$_{(N,I)}$ = 93° C. |
| PCH-6F | 8.00 | V = 16 cSt |
| PCH-7F | 6.00 | Δn = 0.097 |
| CCP-3OCF3 | 10.00 | V₁₀ (1st) = 1.9 V |
| CCP-5OCF3 | 9.00 | |
| BCH-3F.F | 12.00 | |
| BCH-5F.F | 10.00 | |
| ECCP-3CF3 | 10.00 | |
| ECCP-5CF3 | 9.00 | |
| ECCP-3OCF3 | 5.00 | |
| ECCP-5OCF3 | 5.00 | |
| CBC-33F | 2.00 | |
| CBC-53F | 2.00 | |
| CBC-55F | 2.00 | |
| Example 40 | | |
| Substance | mass-% | |
| PCH-5F | 10.00 | T$_{(N,I)}$ = 89° C. |
| PCH-6F | 8.00 | V = 19 cSt |
| PCH-7F | 6.00 | Δn = 0.094 |
| CCP-3OCF3 | 10.00 | V₂₀ = 1.9 V |
| CCP-5OCF3 | 9.00 | |
| ECCP-3OCF3.F | 10.00 | |
| ECCP-5OCF3.F | 9.00 | |
| BCH-3F.F | 12.00 | |
| BCH-5F.F | 10.00 | |
| CECP-3OCF3.F | 5.00 | |
| CECP-5OCF3.F | 5.00 | |
| CBC-33F | 2.00 | |
| CBC-53F | 2.00 | |

-continued

| EXAMPLES | | |
|---|---|---|
| CBC-55F | 2.00 | |
| Example 41 | | |
| Substance | mass-% | |
| PCH-5F | 10.00 | $T_{(N,I)} = 91°$ C. |
| PCH-7F | 6.00 | $V_{20} = 20$ cSt |
| CCP-3OCF3 | 10.00 | $\Delta n = 0.096$ |
| CCP-4OCF3 | 4.00 | $V_{10}$ (1st) = 2.0 V |
| CCP-5OCF3 | 9.00 | |
| CCP-3CL.F.F | 10.00 | |
| CCP-5CL.F.F | 9.00 | |
| CCP-3CL.F | 11.00 | |
| CCP-5CL.F | 9.00 | |
| BCH-3F.F | 12.00 | |
| BCH-5F.F | 10.00 | |
| Example 42 | | |
| Substance | mass-% | |
| PCH-5F | 8.00 | $T_{(N,I)} = 98°$ C. |
| PCH-7F | 6.00 | $V_{20} = 22$ cSt |
| CCP-3OCF$_3$ | 8.00 | $\Delta n = 0.101$ |
| CCP-4OCF$_3$ | 4.00 | $V_{10}$ (1st) = 2.1 V |
| CCP-5OCF$_3$ | 9.00 | |
| CCP-3CL.F.F | 10.00 | |
| CCP-5CL.F.F | 9.00 | |
| CCP-3CL.F | 11.00 | |
| CCP-5CL.F | 9.00 | |
| BCH-3F.F | 12.00 | |
| BCH-5F.F | 10.00 | |
| CCB-3.FF | 2.00 | |
| CCB-5.FF | 2.00 | |

We claim:

1. A liquid crystalline medium based on a mixture of polar compounds having positive dielectric anisotropy, comprising 10 to 50% by weight of at least one compound of formula I

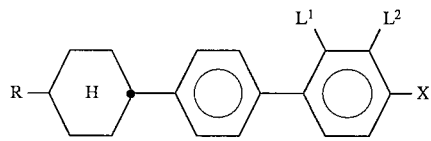

and additionally at least 30 to 70% by weight of one compound of formula II, III or IV:

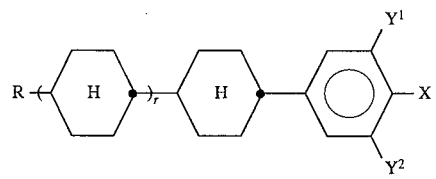

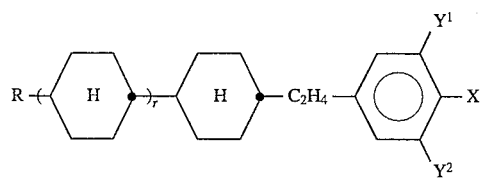

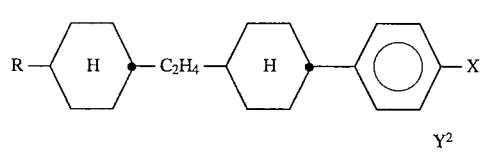

in which

X is F, CF$_3$, OCF$_3$ or OCHF$_2$,

L$^1$ and L$^2$ are each independently H or F, and if one of the radicals L$^1$ and L$^2$ is F, the other radical L$^1$ or L$^2$ is H, R is alkyl, oxaalkyl, fluoroalkyl or alkenyl, in each case having up to 7 carbon atoms, Y$^1$ and Y$^2$ in each case are F, and r is 0 or 1, with the proviso that the weight ratio of compounds of formula I/compounds of formulae II, II and IV is 1:4 to 1:1.

2. A medium according to claim 1, further comprising at least one compound of formulae V to VIII:

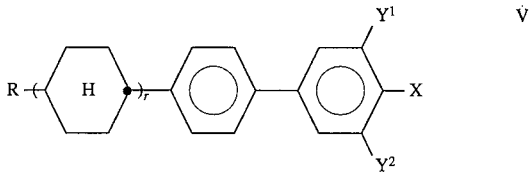

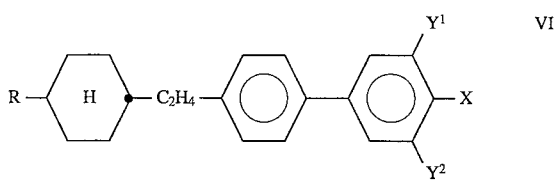

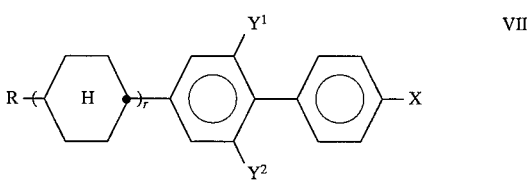

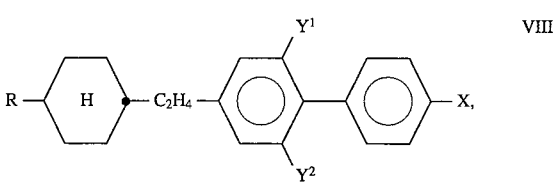

wherein R, X, Y$^1$ and Y$^2$ are as defined in claim 1.

3. A medium according to claim 1, further comprising at least one compound of formulae IX to XII:

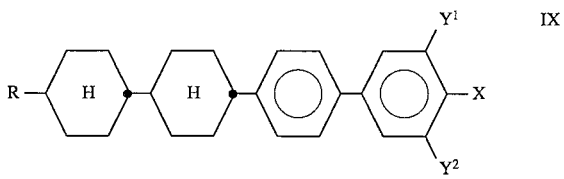

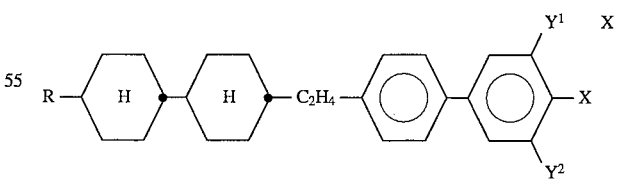

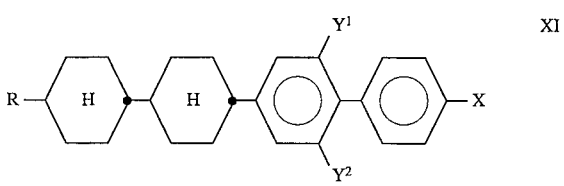

-continued

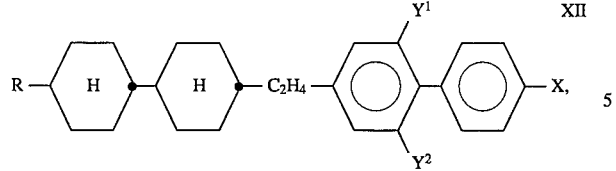

wherein R, X, $Y^1$ and $Y^2$ are as defined in claim 1.

4. A medium according to claim 1, wherein the proportion of compounds of the formulae I to IV together is at least 50% by weight in the total mixture.

5. An electrooptical liquid-crystal display containing a liquid-crystalline medium according to claim 1.

6. A liquid crystalline medium based on a mixture of polar compounds having positive dielectric anisotropy, consisting of 10 to 50% by weight of at least one compound of formula I

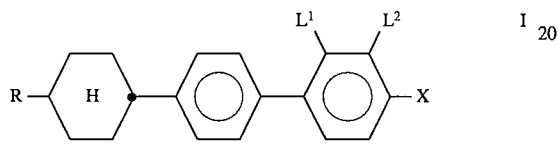

and additionally at least 30 to 70% by weight one compound of formula II, III or IV:

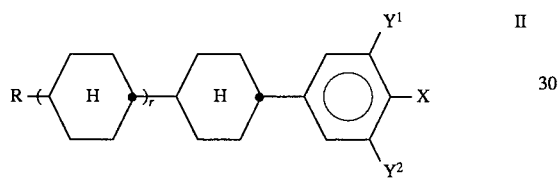

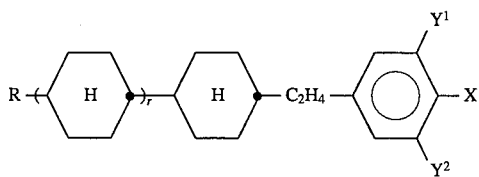

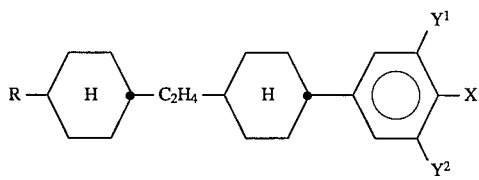

in which
  X is F, $CF_3$, $OCF_3$ or $OCHF_2$,
  $L^1$ and $L^2$ are each independently H or F, and if one of the radicals $L^1$ and $L^2$ is F, the other radical $L^1$ or $L^2$ is H,
  R is alkyl, oxaalkyl, fluoroalkyl or alkenyl, in each case having up to 7 carbon atoms,
  $Y^1$ and $Y^2$ in each case are F, and
  r is 0 or 1 with the proviso that the weight ratio of compounds of formula I/compounds of formulae II, III and IV is 1:4 to 1:1.

7. A liquid crystalline medium based on a mixture of polar compounds having positive dielectric anisotropy, consisting of 10 to 50% by weight of at least one compound of formula I

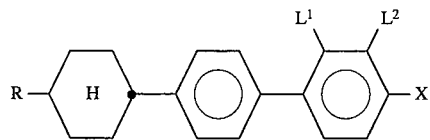

and additionally at least 30 to 70% by weight one compound of formula II, III or IV:

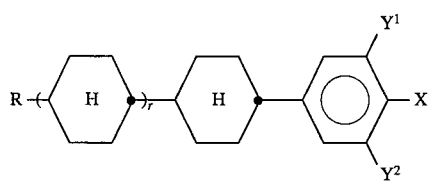

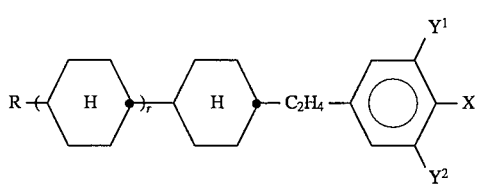

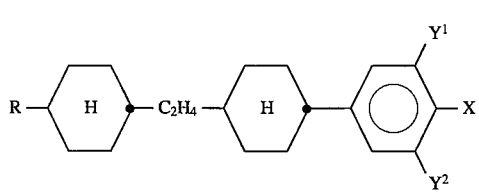

and optionally at least one compound of formulae V to XII,

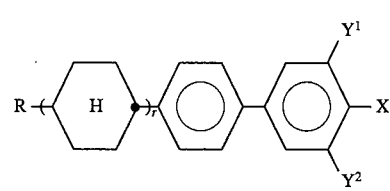

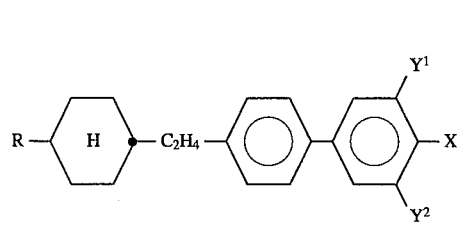

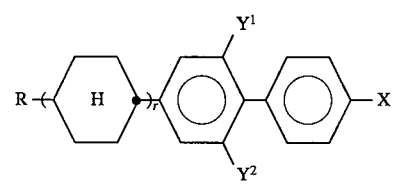

VIII 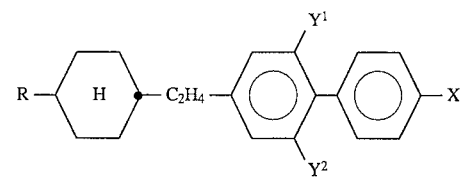

IX 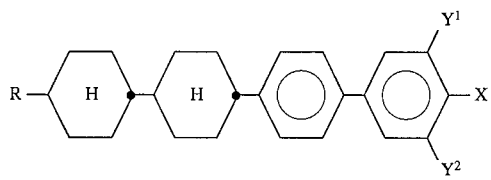

X 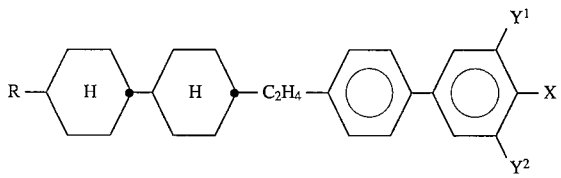

XI 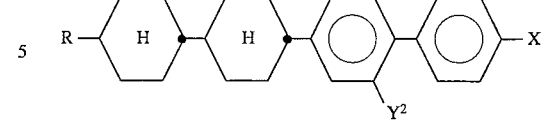

XII 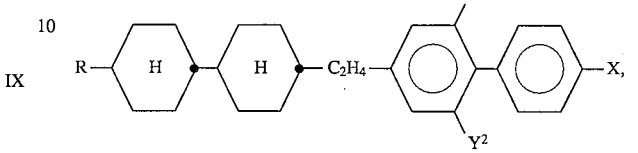

in which

X is F, CF$_3$ OCF$_3$ or OCHF$_2$,

L$^1$ and L$^2$ are each independently H or F, and if one of the radicals L$^1$ and L$^2$ is F, the other radical L$^1$ or L$^2$ is H, R is alkyl, oxaalkyl, fluoroalkyl or alkenyl, in each case having up to 7 carbon atoms, Y$^1$ and Y$^2$ in each case are F, and r is 0 or 1 with the proviso that the weight ratio of compounds of formula I/compounds of formula II, III and IV is 1:4 to 1:1.

* * * * *